US010046633B2

United States Patent
Shimoda (10) Patent No.: US 10,046,633 B2
(45) Date of Patent: Aug. 14, 2018

(54) VEHICLE REAR PORTION STRUCTURE

(71) Applicant: TOYOTA JIDOSHA KABUSHIKI KAISHA, Toyota-shi, Aichi-ken (JP)

(72) Inventor: Akihiko Shimoda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/608,314

(22) Filed: May 30, 2017

(65) Prior Publication Data

US 2018/0029457 A1 Feb. 1, 2018

(30) Foreign Application Priority Data

Jul. 29, 2016 (JP) ................................ 2016-150678

(51) Int. Cl.
*B60K 1/04* (2006.01)
*B60R 16/04* (2006.01)
*B60L 11/18* (2006.01)

(52) U.S. Cl.
CPC ............ *B60K 1/04* (2013.01); *B60L 11/1877* (2013.01); *B60R 16/04* (2013.01); *B60K 2001/0416* (2013.01)

(58) Field of Classification Search
CPC .................... B60K 2001/0416; B60Y 2306/01
See application file for complete search history.

(56) References Cited

U.S. PATENT DOCUMENTS

| 7,066,515 | B2 * | 6/2006 | Pierce | B60R 19/00 180/68.5 |
| 7,921,951 | B2 * | 4/2011 | Watanabe | B60K 1/04 180/68.5 |
| 8,051,934 | B2 * | 11/2011 | Kiya | B60K 1/04 180/274 |
| 8,708,401 | B2 * | 4/2014 | Lee | B62D 21/152 280/124.109 |
| 9,126,637 | B2 * | 9/2015 | Eberle | B60K 1/04 |
| 2009/0026802 | A1 * | 1/2009 | Imada | B62D 21/152 296/187.11 |
| 2013/0161106 | A1 | 6/2013 | Iwai et al. | |
| 2014/0027190 | A1 * | 1/2014 | Hishinuma | H05K 5/0217 180/68.5 |
| 2015/0166109 | A1 | 6/2015 | Eberle et al. | |

(Continued)

FOREIGN PATENT DOCUMENTS

| JP | 2012-62018 A | 3/2012 |
| JP | 2013-18429 A | 1/2013 |

(Continued)

*Primary Examiner* — Brian L Swenson
(74) *Attorney, Agent, or Firm* — Oliff PLC (57) ABSTRACT

A vehicle rear portion structure that includes: rear wheel wells provided as a right and left pair in a vehicle rear portion; reinforcement members that are attached to vehicle width direction inner surfaces of the right and left pair of the rear wheel wells and project inward in the vehicle width direction to form closed cross sections with the rear wheel wells; and a battery that is placed between the right and left pair of rear wheel wells and on a rear floor panel and that is provided with abutting portions that are formed at both vehicle width direction end portions of the battery and that are disposed opposing the reinforcement members in a vehicle forward and rearward direction.

5 Claims, 6 Drawing Sheets

(56) References Cited

U.S. PATENT DOCUMENTS

| | | | |
|---|---|---|---|
| 2015/0273996 A1* | 10/2015 | Onodera | B60K 1/04 |
| | | | 429/100 |
| 2015/0343971 A1* | 12/2015 | Ikeda | B60K 1/04 |
| | | | 429/100 |
| 2016/0297483 A1* | 10/2016 | Inagaki | B60K 1/04 |
| 2017/0029034 A1* | 2/2017 | Faruque | B60K 1/04 |
| 2017/0088182 A1* | 3/2017 | Hara | B60K 1/04 |

FOREIGN PATENT DOCUMENTS

| | | |
|---|---|---|
| JP | 2013-233915 A | 11/2013 |
| JP | 2015-000615 A | 1/2015 |

\* cited by examiner

VEHICLE REAR PORTION STRUCTURE

CROSS-REFERENCE TO RELATED APPLICATION

This application is based on and claims priority under 35 USC 119 from Japanese Patent Application No. 2016-150678 filed on Jul. 29, 2016, which is incorporated by reference herein.

BACKGROUND

Technical Field

The present disclosure relates to a vehicle rear portion structure.

Related Art

Japanese Patent Application Laid-open (JP-A) No. 2015-615 discloses a structure for mounting a battery in a vehicle. In this structure, the battery is disposed on a rear portion floor of the vehicle, and a battery member is provided on the outer peripheral portion of the battery. The battery member is coupled to a rear cross member disposed on the vehicle rear side of the battery. Consequently, at the time of a rear impact to the vehicle, the impact load that has been input to the rear cross member is transmitted to the battery member, so the battery moves in the vehicle forward direction.

However, JP-A No. 2015-615 does not disclose a configuration that reduces movement of the battery in the vehicle forward direction. Meanwhile, in recent years there has been a demand to extend the cruising range of electric vehicles, and to meet this demand the battery mounted in the vehicle is tending to increase in size and with this the weight of the battery itself is tending to increase. For this reason, when, at the time of a rear impact, the impact load is input to the battery, there is the potential for the amount of movement of the battery to increase. Consequently, the technology of JP-A No. 2015-615 has room for improvement in this respect.

SUMMARY

In consideration of the circumstances described above, it is an object of the present disclosure to obtain a vehicle rear portion structure that can reduce movement of the battery at the time of a rear impact.

A vehicle rear portion structure of a first aspect includes: rear wheel wells provided as a right and left pair in a vehicle rear portion; reinforcement members that are attached to vehicle width direction inner surfaces of the right and left pair of rear wheel wells and project inward in the vehicle width direction to form closed cross sections with the rear wheel wells; and a battery that is placed between the right and left pair of rear wheel wells and on a rear floor panel and is provided with abutting portions that are formed in both vehicle width direction end portions of the battery and are disposed opposing the reinforcement members in the vehicle forward and rearward direction.

DESCRIPTION OF EMBODIMENT

An embodiment of a vehicle rear portion structure pertaining to the present disclosure will be described below using FIG. 1 to FIG. 4. It should be noted that arrow FR appropriately shown in these drawings indicates a forward direction in the vehicle forward and rearward direction, arrow OUT indicates an outward direction in the vehicle width direction, and arrow UP indicates an upward direction in the vehicle vertical direction.

Figure 1:
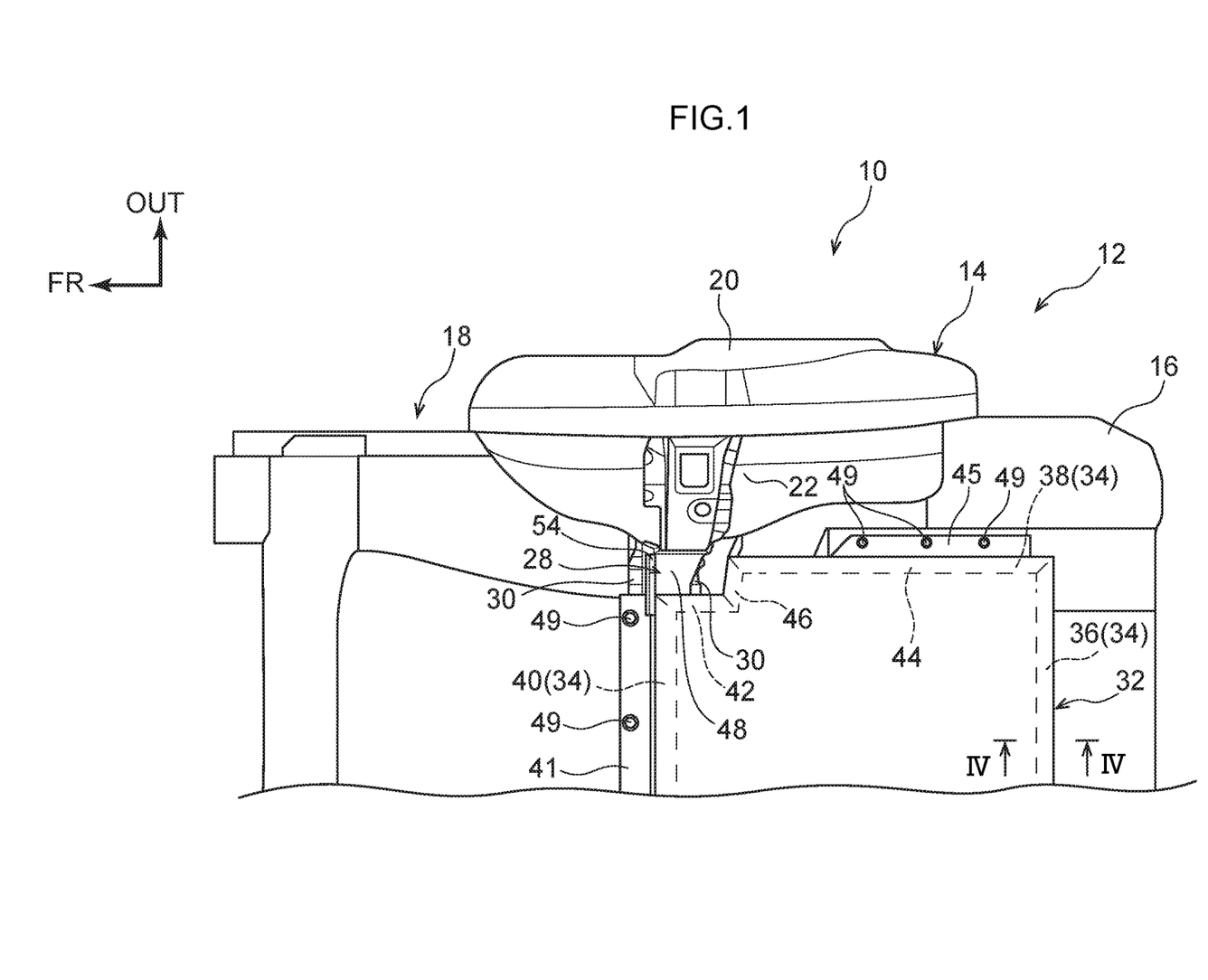
FIG. 1 is a plan view showing part of a vehicle rear portion having a vehicle rear portion structure pertaining to an embodiment.

As shown in FIG. 1, a vehicle rear portion structure 12 in a vehicle 10 whose wheels are driven by a motor, for example, is configured to include rear wheel wells 14 and a rear floor panel 16. The peripheral configuration including the rear wheel wells 14 and the rear floor panel 16 will be described below. It should be noted that the vehicle rear portion structure 12 pertaining to this embodiment is basically configured to be bilaterally symmetrical (symmetrical relative to a vehicle width direction centerline), so in FIG. 1 to FIG. 3 mainly one side (the vehicle right side) in the vehicle width direction is shown, and in the following description also mainly one side in the vehicle width direction will be described.

The rear wheel wells 14 house rear wheels and are disposed in right and left vehicle body side portions 18 in the vehicle rear portion. Each rear wheel well 14 is equipped with a wheel well outer member 20 that configures the vehicle width direction outer section of the rear wheel well 14 and a wheel well inner member 22 that configures the vehicle width direction inner section of the rear wheel well 14. The wheel well outer member 20 and the wheel well inner member 22 are formed by stamping sheet metal. The wheel well outer member 20 and the wheel well inner member 22 are joined to each other by spot welding at flange portions 24 and 26 (see FIG. 2) provided on their peripheral edge portions. Because of this, the dome-shaped rear wheel wells 14 are formed.

Strainers 28 serving as reinforcement members that receive input from suspensions are attached to the wheel well inner members 22. Specifically, the strainers 28 are attached in in such a way that they extend along the substantially vehicle vertical direction in the substantially central portions, in the vehicle forward and rearward direction, of the wheel well inner members 22 and project inward in the vehicle width direction relative to the wheel well inner members 22. The cross section of each strainer 28 as cut in a direction orthogonal to its longitudinal direction is formed in a substantially hat-like shape having a pair of flange portions 30 provided on the peripheral edge portion, and the strainers 28 are joined, at the flange portions 30, to the wheel well inner members 22 by spot welding. Because of this, the strainers 28 form closed cross sections with the wheel well inner members 22.

The rear floor panel 16 is attached to the lower end portions of the wheel well inner members 22. The rear floor panel 16 is formed in the shape of a substantially flat panel whose panel thickness direction coincides with the vehicle vertical direction, and the rear floor panel 16 configures the floor of a luggage compartment.

A battery 32 that supplies electrical power to the motor that drives the wheels of the vehicle 10 is placed between the rear wheel wells 14 and on the upper surface of the rear floor panel 16. The battery 32 is formed in the shape of a substantially rectangular box and has plural cell modules disposed inside. The cell modules are protected, by a later-described frame member 34 that configures a side surface portion of the battery 32, with respect to loads input from outside.

Figure 3:
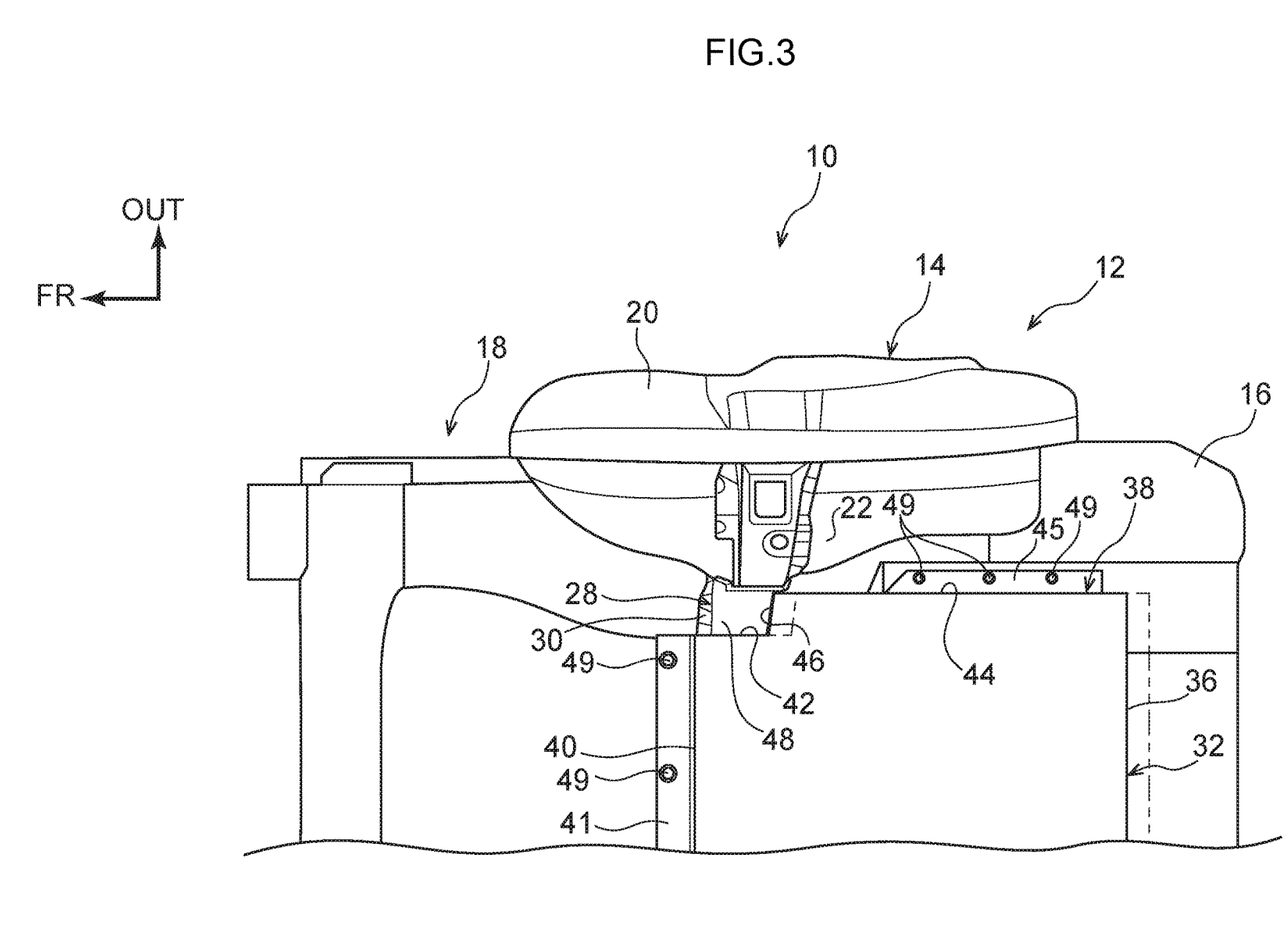
FIG. 3 is a plan view, corresponding to FIG. 1, showing the vehicle rear portion having the vehicle rear portion structure pertaining to the embodiment at the time of a rear impact.
Figure 4:
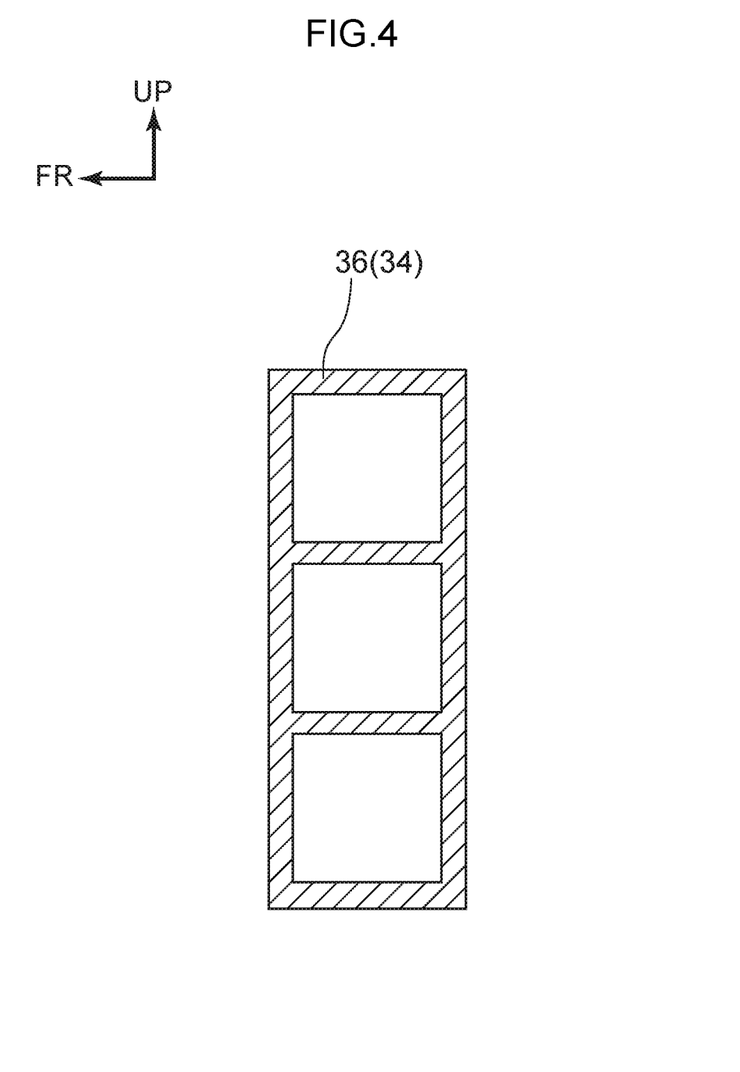
FIG. 4 is an enlarged cross-sectional view showing a state cut along line IV-IV of FIG. 1.

As shown in FIG. 3, the side surface portion of the battery 32 is configured by a frame member 34. The frame member 34 has a configuration where a rear end portion frame constituent member 36 provided on the rear end portion side of the battery 32, width end portion frame constituent members 38 provided on both vehicle width direction end portion sides of the battery 32, and a front end portion frame constituent member 40 provided on the front end portion side of the battery 32 are integrally joined to each other by fastening members.

The rear end portion frame constituent member 36 is configured by an extruded member made of aluminum alloy, for example, and extends with its longitudinal direction coinciding with the vehicle width direction. Furthermore, the cross section of the rear end portion frame constituent member 36 as cut in a direction orthogonal to its longitudinal direction is formed in a rectangular shape whose longitudinal direction coincides with the vehicle vertical direction, and the rear end portion constituent member 36 is formed as a hollow member having plural closed cross section portions inside (see FIG. 4). It should be noted that the rear end portion frame constituent member 36 is disposed further in the vehicle forward direction than the rear end of the rear floor panel 16.

The front end portion frame constituent member 40, like the rear end portion frame constituent member 36, is configured by an extruded member made of aluminum alloy and extends with its longitudinal direction coinciding with the vehicle width direction. Furthermore, like the rear end portion frame constituent member 36, the cross section of the front end portion frame constituent member 40 as cut in a direction orthogonal to its longitudinal direction is formed in a rectangular shape whose longitudinal direction coincides with the vehicle vertical direction, and the front end portion constituent member 40 is formed as a hollow member having plural closed cross section portions inside.

Each width end portion frame constituent member 38 is configured by the same extruded member made of aluminum alloy as the rear end portion frame constituent member 36, and has a width frame constituent member front portion 42, a width frame constituent member rear portion 44, and an abutting portion 46. The width frame constituent member front portion 42 and the width frame constituent member rear portion 44 extend with their longitudinal direction coinciding with the vehicle forward and rearward direction. The width frame constituent member front portion 42 configures the vehicle front portion of the width end portion frame constituent member 38. The width frame constituent member rear portion 44 configures the vehicle rear portion of the width end portion frame constituent member 38. Furthermore, the width frame constituent member front portions 42 are disposed further inward in the vehicle width direction than vehicle width direction inner wall portions 48 of the strainers 28. Additionally, the width frame constituent member rear portions 44 are disposed further in the vehicle rearward direction and further outward in the vehicle width direction than the vehicle width direction inner wall portions 48 of the strainer 28 at regions corresponding to the width frame constituent member rear portions 44. It should be noted that the vehicle width direction end portions of the front end portion frame constituent member 40 are joined by fasteners to the front end portions of the width frame constituent member front portions 42. Furthermore, the vehicle width direction end portions of the rear end portion frame constituent member 36 are joined to the rear end portions of the width frame constituent member rear portions 44.

A bracket 45 is provided on the lower end portion of each width frame constituent member rear portion 44. Each bracket 45 extends along the vehicle width direction with its plate thickness direction coinciding with the vehicle vertical direction, and the vehicle width direction inner end portion of each bracket 45 is secured to the battery 32. Furthermore, plural (in this embodiment, three) fastening holes that penetrate the bracket 45 in its plate thickness direction are formed in the vehicle width direction outer end portion of each bracket 45. Fasteners 49 are inserted into and fastened in these fastening holes and through holes formed in the rear floor panel 16 in positions corresponding to these fastening holes.

A bracket 41 is provided on the lower end portion of the front end portion frame constituent member 40. The bracket 41 extends along the vehicle forward and rearward direction with its plate thickness direction coinciding with the vehicle vertical direction, and the rear end portion of the bracket 41 is secured to the battery 32. Furthermore, plural (in this embodiment, four) fastening holes that penetrate the bracket 41 in its plate thickness direction are formed in the front end portion of the bracket 41. Fasteners 49 are inserted into and fastened in these fastening holes and through holes formed in the rear floor panel 16 in positions corresponding to these fastening holes. Because of these, the frame member 34 and the battery 32 are secured to the rear floor panel 16. It should be noted that although in this embodiment the battery 32 is secured to the rear floor panel 16 via the brackets 41 and 45, the battery 32 is not limited to this and may also be directly secured to the rear floor panel 16.

The abutting portions 46 are disposed between the width frame constituent member front portions 42 and the width frame constituent member rear portions 44. The abutting portions 46 are configured by the same extruded members made of aluminum alloy as the rear end portion frame constituent member 36, extend along the substantially vehicle width direction, and couple the rear ends of the width frame constituent member front portions 42 and the front ends of the width frame constituent member rear portions 44 to each other in the substantially vehicle width direction. Because of this, the abutting portions 46 are disposed on the vehicle rear sides of the strainers 28 and coincide with the strainers 28 as viewed in a vehicle front view (see FIG. 2). That is, the abutting portions 46 are disposed opposing the strainers 28 in the vehicle forward and rearward direction.

Figure 2:
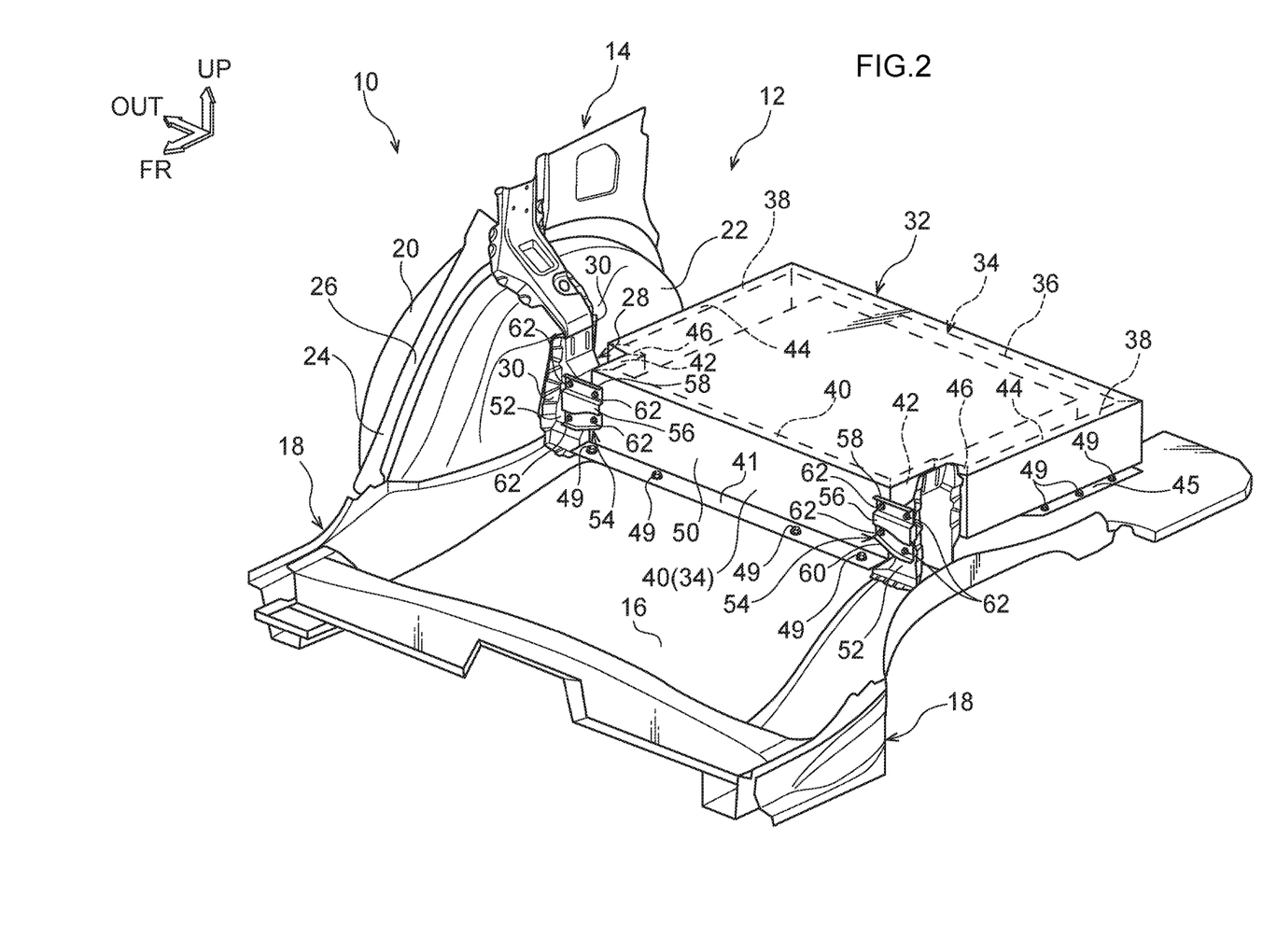
FIG. 2 is a perspective view showing, as viewed from the vehicle front side, the part of the vehicle rear portion having the vehicle rear portion structure pertaining to the embodiment.

As shown in FIG. 2, the front end portion of the battery 32 is provided on the vehicle width direction inner sides of the strainers 28 and is provided in a position corresponding to the strainers 28 of the right and left pair of rear wheel wells 14 in the vehicle forward and rearward direction. Specifically, a front surface 50 of the front end portion frame constituent member 40 in the front end portion of the battery 32 and front side surfaces 52 of the strainers 28 are disposed so as to lie in substantially the same plane. Additionally, the front end portion of the battery 32 is coupled to the strainers 28 via coupling members 54.

Each coupling member 54 is formed in the shape of a substantially rectangular plate as viewed in a vehicle plan view and has a bead portion 56 formed in the substantially central portion thereof in the vehicle vertical direction. The bead portion 56 extends in the substantially vehicle width direction and projects in the vehicle forward direction. Plural (in this embodiment, two) strainer fastening holes that penetrate the coupling member 54 in its plate thickness direction are provided in the vehicle width direction outer end portion of each coupling member 54. Specifically, one strainer fastening hole is formed between the bead portion 56 and an upper end portion 58 in the vehicle width direction outer end portion of the coupling member 54, and the other strainer fastening hole is formed between the bead portion 56 and a lower end portion 60 in the vehicle width direction outer end portion of the coupling member 54. Additionally, through holes are also formed in the front side surfaces 52 of the strainers 28 in positions corresponding to the strainer fastening holes in the coupling members 54, and fasteners 62 are inserted through and fastened in the strainer fastening holes in the coupling members 54 and the through holes in the strainers 28.

Plural (in this embodiment, two) battery fastening holes that penetrate the coupling member 54 in its plate thickness direction are provided in the vehicle width direction inner end portion of each coupling member 54. Specifically, one battery fastening hole is formed between the bead portion 56 and the upper end portion 58 in the vehicle width direction inner side of the coupling member 54, and the other battery fastening hole is formed between the bead portion 56 and the lower end portion 60 in the vehicle width direction inner side of the coupling member 54. Additionally, through holes are also formed in the frame member 34 on the front end portion of the battery 32 in positions corresponding to the battery fastening holes in the coupling members 54, and fasteners 62 are inserted through and fastened in the battery fastening holes in the coupling members 54 and the through holes in the frame member 34. Because of these, the right and left pair of rear wheel wells 14 are coupled to each other.

Action and Effects of the Embodiment

Next, the action and effects of the embodiment will be described.

Here, the action and effects of the embodiment will be described using a contrasting example shown in FIG. 5 and FIG. 6. It should be noted that, regarding constituent parts that are the same as those of the embodiment, the same numbers are assigned thereto and description thereof will be omitted.

Figure 6:
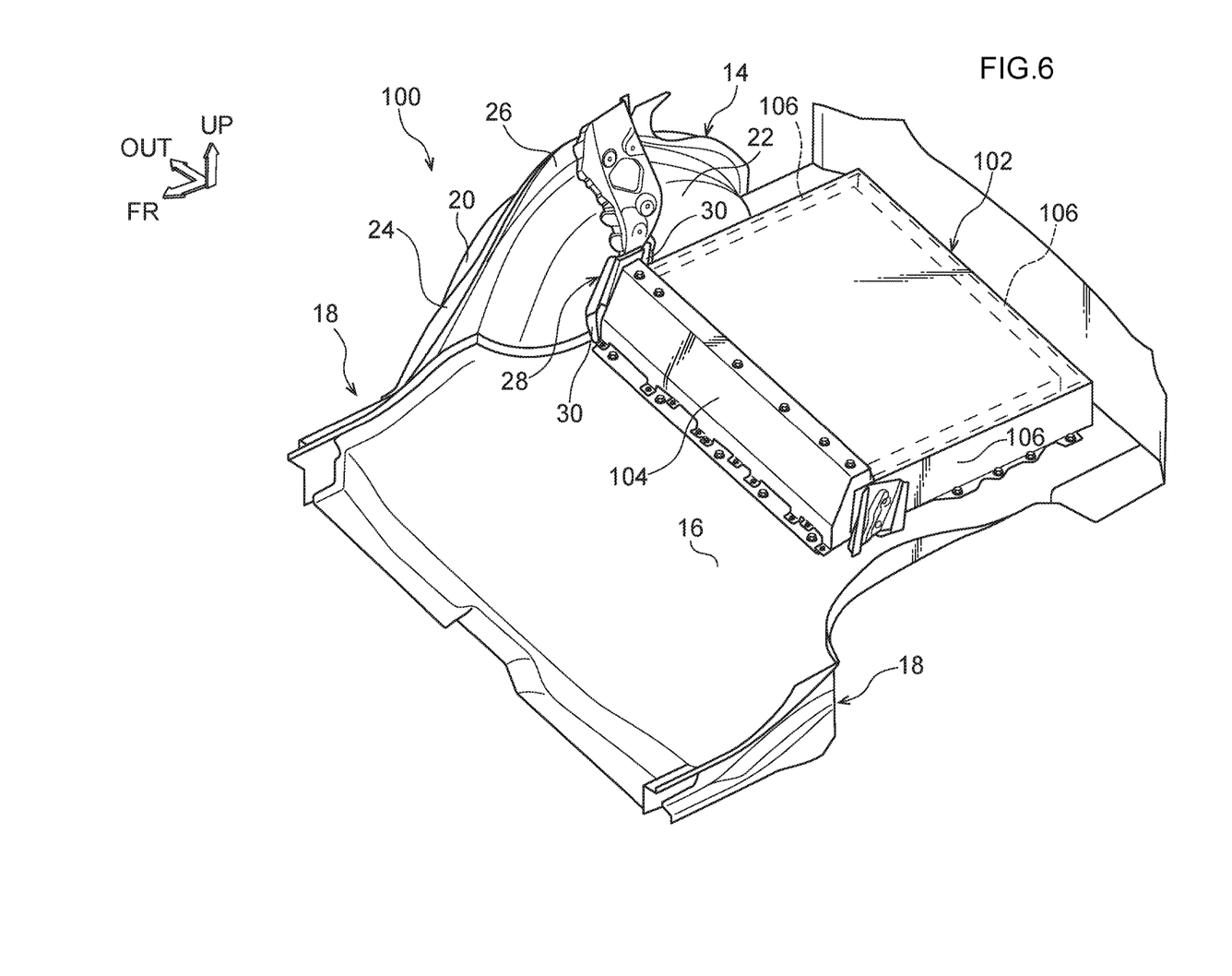
FIG. 6 is a perspective view, corresponding to FIG. 2, showing, as viewed from the vehicle front side, the part of the vehicle rear portion having the vehicle rear portion structure pertaining to the contrasting example.

As shown in FIG. 6, a battery 102 is placed between the rear wheel wells 14 of a vehicle 100 and on the rear floor panel 16. The battery 102 is formed in the shape of a substantially rectangular box by plural side wall portions 106 and has plural cell modules disposed inside.

Figure 5:
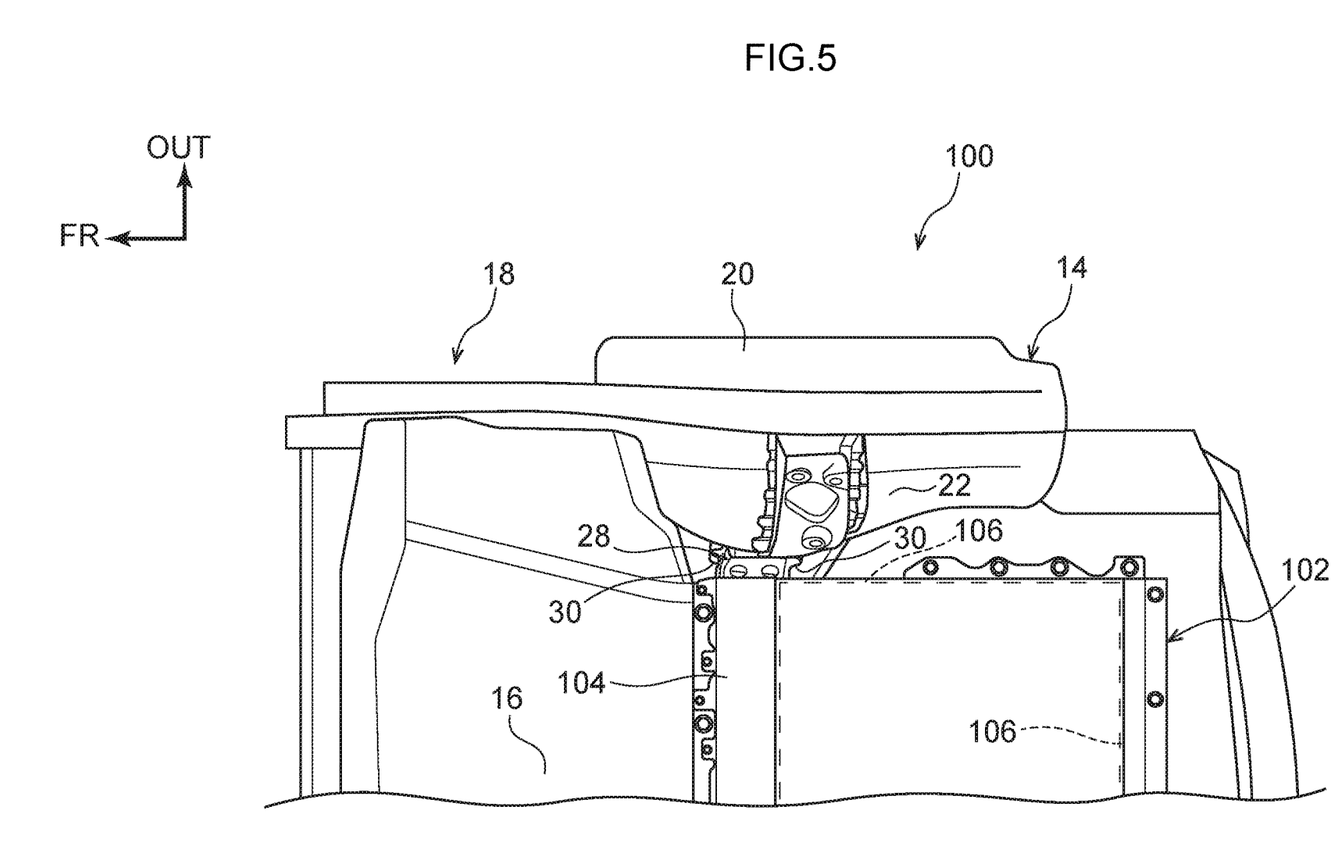
FIG. 5 is a plan view, corresponding to FIG. 1, showing part of a vehicle rear portion having a vehicle rear portion structure pertaining to a contrasting example.

As shown in FIG. 5, the side wall portions 106 on both vehicle width direction end portions of the battery 102 extend in the vehicle forward and rearward direction as viewed in a vehicle plan view and are disposed on the vehicle width direction inner sides of the strainers 28 of the rear wheel wells 14. It should be noted that one strainer 28 and the other strainer 28 are coupled to each other in the vehicle width direction by a center floor cross member 104 extending in the vehicle width direction. Consequently, the front end portion of the battery 102 is disposed on the vehicle rear side of the center floor cross member 104.

In the case according to the contrasting example, the size of the battery 102 is limited to a size that can be disposed in the space between the right and left pair of rear wheel wells 14 and on the vehicle rear side of the center floor cross member 104. For this reason, for increasing the size of the battery 102 it is conceivable to remove the center floor cross member 104 and extend the front end portion of the battery 102 in the vehicle forward direction. However, in this case, the center floor cross member 104 that had reduced movement of the battery 102 in the vehicle forward direction is no longer there, so when, at the time of a rear impact, the impact load is input to the battery 102, there is the potential for the amount of movement of the battery 102 to increase.

In contrast to this, in the embodiment, as shown in FIG. 1, the abutting portions 46 are provided in both vehicle width direction end portions of the battery 32. The abutting portions 46 are disposed opposing, in the vehicle forward and rearward direction, the strainers 28 attached to the vehicle width direction inner surfaces of the right and left pair of rear wheel wells 14. Consequently, when, at the time of a rear impact, the impact load is input to the battery 32 and the battery 32 moves in the vehicle forward direction, the abutting portions 46 come into abutting contact with the strainers 28 as shown in FIG. 3. The strainers 28 form closed cross sections with the rear wheel wells 14, so they are more rigid than general portions of the rear wheel wells 14. For this reason, the impact load can be transmitted more reliably from the strainers 28 via the rear wheel wells 14 to the upper body and suspensions, and movement of the battery 32 itself can be reduced. Because of this, movement of the battery 32 at the time of a rear impact can be reduced.

Furthermore, the front end portion of the battery 32 positioned further in the vehicle forward direction than the abutting portions 46 is provided on the vehicle width direction inner sides of the strainers 28, so the front end portion of the battery 32 can be set further in the vehicle forward direction than the strainers 28 in the vehicle forward and rearward direction. That is to say, the size of the battery 32 itself can be increased regardless of the position of the abutting portions 46 that come into abutting contact with the strainers 28. Because of this, the size of the battery 32 can be increased while reducing movement of the battery 32 at the time of a rear impact.

Moreover, the rear end portion frame constituent member 36 and the width end portion frame constituent members 38 are provided in an integrally configured state in the battery 32. Consequently, the impact load input to the battery 32 at the time of a rear impact is transmitted from the rear end portion frame constituent member 36 to the width end portion frame constituent members 38 and thereafter is transmitted from the abutting portions 46 provided in the width end portion frame constituent members 38 to the strainers 28. Because of this, the impact load can be transmitted more reliably to the strainers 28 while controlling deformation of the battery 32 itself. Because of this, movement of the battery 32 at the time of a rear impact can be further reduced.

It should be noted that although in this embodiment the front end portion of the battery 32 is disposed in a position corresponding to the strainers 28 of the right and left pair of rear wheel wells 14 in the vehicle forward and rearward direction, the front end portion of the battery 32 is not limited to this and may also be extended in the vehicle forward direction beyond the strainers 28 (for example, as far as the back surface of a rear seat back) to further increase the size of the battery 32. Conversely from this, the battery 32 may also be formed in a rectangular shape as viewed in a vehicle plan view by disposing the front end portion of the battery 32 on the vehicle rear side of the strainers 28. In this case, the battery 32 may be enlarged in the vehicle width direction to further increase the size of the battery 32.

Furthermore, the width frame constituent member front portions 42 of the frame member 34 of the battery 32 are entirely disposed further inward in the vehicle width direction than the vehicle width direction inner wall portions 48 of the strainers 28, but the vehicle rear portion structure 12 is not limited to this and may also have a configuration where just those regions of the frame member 34 corresponding to the strainers 28 are disposed further inward in the vehicle width direction than the vehicle width direction inner wall portions 48 of the strainers 28 while other regions are disposed further outward in the vehicle width direction than the vehicle width direction inner wall portions 48 of the strainers 28.

Moreover, the frame member 34 is configured by the rear end portion frame constituent member 36, the width end portion frame constituent members 38, and the front end portion frame constituent member 40, but the frame member 34 is not limited to this and may also be configured by just the rear end portion frame constituent member 36 and the width end portion frame constituent members 38.

Moreover, the abutting portions 46 of the battery 32 are disposed opposing, in the vehicle forward and rearward direction, the strainers 28 serving as reinforcement members, but the abutting portions 46 are not limited to this and may also be disposed opposing, in the vehicle forward and rearward direction, other members provided on the rear wheel wells 14.

Furthermore, the abutting portions 46 of the battery 32 are provided in the width end portion frame constituent members 38 of the frame member 34, but the abutting portions 46 are not limited to this and may also be provided in the front end portion frame constituent member 40 of the battery 32 or provided in regions other than these.

An embodiment of the present disclosure has been described above, but the present disclosure is not limited to what has been described above and can be modified and implemented in a variety of ways other than what has been described above without departing from the spirit of the present disclosure.

A vehicle rear portion structure of a first aspect includes: rear wheel wells provided as a right and left pair in a vehicle rear portion; reinforcement members that are attached to vehicle width direction inner surfaces of the right and left pair of rear wheel wells and project inward in the vehicle width direction to form closed cross sections with the rear wheel wells; and a battery that is placed between the right and left pair of rear wheel wells and on a rear floor panel and is provided with abutting portions that are formed in both vehicle width direction end portions of the battery and are disposed opposing the reinforcement members in the vehicle forward and rearward direction.

According to the first aspect, the abutting portions are provided in both vehicle width direction end portions of the battery. The abutting portions are disposed opposing, in the vehicle forward and rearward direction, the reinforcement members attached to the vehicle width direction inner surfaces of the right and left pair of rear wheel wells. Consequently, when, at the time of a rear impact, the impact load is input to the battery and the battery moves in the vehicle forward direction, the abutting portions come into abutting contact with the reinforcement members. The reinforcement members form closed cross sections with the rear wheel wells, so the impact load is transmitted more reliably from the reinforcement members to the rear wheel wells and movement of the battery itself can be reduced.

A vehicle rear portion structure of a second aspect is the first aspect, wherein a front end portion of the battery positioned further in the vehicle forward direction than the abutting portions is provided on the vehicle width direction inner sides of the reinforcement members.

According to the second aspect, the front end portion of the battery positioned further in the vehicle forward direction than the abutting portions is provided on the vehicle width direction inner sides of the reinforcement members, so the front end portion of the battery can be set further in the vehicle forward direction than the reinforcement members in the vehicle forward and rearward direction. That is, the size of the battery itself can be increased regardless of the position of the abutting portions that come into abutting contact with the reinforcement members.

A vehicle rear portion structure of a third aspect is the first or second aspect, wherein the battery is provided with a rear end portion frame constituent member that is disposed on the rear end portion of the battery and extends in the vehicle width direction and width end portion frame constituent members that are disposed on both vehicle width direction end portions of the battery, extend in the vehicle forward and rearward direction, and have the abutting portions, and the rear end portion frame constituent member and the width end portion frame constituent members are integrally configured.

According to the third aspect, the rear end portion frame constituent member and the width end portion frame constituent members are provided in an integrally configured state in the battery. Consequently, the impact load input to the battery at the time of a rear impact is transmitted from the rear end portion frame constituent member to the width end portion frame constituent members and thereafter is transmitted from the abutting portions provided in the width end portion frame constituent members to the reinforcement members. Because of this, the impact load can be transmitted more reliably to the reinforcement members while controlling deformation of the battery itself.

The vehicle rear portion structure of the first aspect can reduce movement of the battery at the time of a rear impact.

The vehicle rear portion structure of the second aspect can allow the size of the battery to be increased while reducing movement of the battery at the time of a rear impact.

The vehicle rear portion structure of the third aspect can further reduce movement of the battery at the time of a rear impact.

What is claimed is:

1. A vehicle rear portion structure comprising:
   rear wheel wells provided as a right and left pair in a vehicle rear portion;
   reinforcement members that are attached to vehicle width direction inner surfaces of the right and left pair of the rear wheel wells and project inward in the vehicle width direction to form closed cross sections with the rear wheel wells; and
   a battery that is placed between the right and left pair of rear wheel wells and on a rear floor panel and that is provided with abutting portions that are formed at both vehicle width direction end portions of the battery and that are disposed opposing the reinforcement members in a vehicle forward and rearward direction;

wherein the reinforcement members are welded to the vehicle width direction inner surfaces of the right and left pair of the rear wheel wells.

2. The vehicle rear portion structure according to claim 1, wherein a portion of the battery positioned further in the vehicle forward direction than the abutting portions is provided on vehicle width direction inner sides of the reinforcement members.

3. The vehicle rear portion structure according to claim 1, wherein:

the battery is provided with a rear end portion frame constituent member that is disposed at a rear end portion of the battery and extends in the vehicle width direction and width end portion frame constituent members that are disposed at both vehicle width direction end portions of the battery, that extend in the vehicle forward and rearward direction, and that have the abutting portions, and the rear end portion frame constituent member and the width end portion frame constituent members are integrally configured.

4. The vehicle rear portion structure according to claim 3, further comprising a front end portion frame constituent member that is provided on a front end portion side of the battery, wherein the front end portion frame constituent member is configured integrally with the rear end portion frame constituent member and the width end portion frame constituent members.

5. The vehicle rear portion structure according to claim 1, wherein:

the battery is provided with a rear end portion frame constituent member that is disposed at a rear end portion of the battery and that extends in the vehicle width direction, width end portion frame constituent members that are disposed at both vehicle width direction end portions of the battery and that extend in the vehicle forward and rearward direction, and a front end portion frame constituent member that is provided on a front end portion side of the battery and that has the abutting portions, and the rear end portion frame constituent member, the width end portion frame constituent members, and the front end portion frame constituent member are integrally configured.

* * * * *